US008040865B2

(12) United States Patent
Ohm et al.

(10) Patent No.: US 8,040,865 B2
(45) Date of Patent: *Oct. 18, 2011

(54) METHOD OF ASSIGNING PRECODING VECTORS IN A MOBILE CELLULAR NETWORK

(75) Inventors: Michael Ohm, Stuttgart (DE); Lutz Schoenerstedt, Ludwigsburg (DE)

(73) Assignee: Alcatel Lucent, Paris (FR)

( * ) Notice: Subject to any disclaimer, the term of this patent is extended or adjusted under 35 U.S.C. 154(b) by 155 days.

This patent is subject to a terminal disclaimer.

(21) Appl. No.: 12/494,756

(22) Filed: Jun. 30, 2009

(65) Prior Publication Data

US 2010/0020709 A1  Jan. 28, 2010

(30) Foreign Application Priority Data

Jun. 30, 2008  (EP) .................................... 08290631

(51) Int. Cl.
 *H04W 4/00*  (2009.01)
(52) U.S. Cl. ...................................... 370/338; 370/252
(58) Field of Classification Search .................. 370/252, 370/328–338, 341–348; 455/450, 452.1, 455/452.2, 500; 375/260–265, 267
 See application file for complete search history.

(56) References Cited

U.S. PATENT DOCUMENTS

| | | | | |
|---|---|---|---|---|
| 7,733,765 | B2 * | 6/2010 | Suo et al. ....................... | 370/208 |
| 7,873,113 | B2 * | 1/2011 | Takano et al. .................. | 375/267 |
| 2007/0155336 | A1 | 7/2007 | Nam et al. | |
| 2008/0225975 | A1 * | 9/2008 | Lee et al. ....................... | 375/267 |
| 2009/0285156 | A1 * | 11/2009 | Huang et al. ................... | 370/328 |
| 2010/0098009 | A1 * | 4/2010 | Higuchi ......................... | 370/329 |
| 2011/0013563 | A1 * | 1/2011 | Sivanesan et al. ............. | 370/328 |

OTHER PUBLICATIONS

Michael Mao Wang et al., "Multi-antenna Techniques in Ultra Mobile Broadband Communication systems," 6th Annual Communication Networks and Services Research Conference; IEEE, pp. 397-403, (May 5, 2008).
NTT DoCoMo, "Investigation on Precoding Scheme for MU-MIMO in E-UTRA Downlink," 3GPP Draft; R1-072422 Precoding Scheme for DL MU-MIMO, 3rd Generation Partnership Project, pp. 1/6-6/6, Kobe, Japan, (May 7-11, 2007).
3GGP2, "Physical Layer for Ultra Mobile Broadband (UMB) Air Interface Specification," 3GGP2, 3rd Generation Partnership Project 2, No. C.S0084-001-0, Version 2.0, pp. 2-86-2-95, (Aug. 2007).
Interdigital Communications et al., "Downlink Control Signaling for MU-MIMO," 3GPP Draft, R1-081386, 3rd Generation Partnership Project, pp. 1-5, Shenzhen, China, (Mar. 31-Apr. 4, 2008).
European Search Report.

* cited by examiner

*Primary Examiner* — Pao Sinkantarakorn
*Assistant Examiner* — Kan Yuen
(74) *Attorney, Agent, or Firm* — Fay Sharpe LLP

(57) ABSTRACT

The invention concerns a method for assigning precoding vectors in a mobile cellular network as well as a base station (21). A base station (21) provides a code book comprising indexed precoding vectors to one or more mobile stations (41, 42, 43) associated with the base station (21) via a downlink channel (1001, 2001, 3001). A mobile station (41, 42, 43) associated with the base station (21) selects one or more indices of preferred precoding vectors from the code book and reports the indices of the one or more preferred precoding vectors to the base station (21) via an uplink channel (1002, 2002, 3002). The mobile station (41, 42, 43) selects one or more indices of preferred companion precoding vectors from the code book, which are precoding vectors that shall preferably be used by the base station (21) for other mobile stations served by the base station (21) on the same time/frequency resource, and reports the one or more indices associated with the preferred companion precoding vectors to the base station (21) via the uplink channel (1002, 2002, 3002). For each mobile station associated with the base station (21), the base station (21) determines a precoding vector based on the reported one or more indices of the preferred precoding vectors and based on the reported one or more indices of the preferred companion precoding vectors.

11 Claims, 2 Drawing Sheets

METHOD OF ASSIGNING PRECODING VECTORS IN A MOBILE CELLULAR NETWORK

BACKGROUND OF THE INVENTION

The invention is based on a priority application EP08290631.4 which is hereby incorporated by reference.

The present invention relates to a method of and a base station for assigning precoding vectors in a mobile cellular network.

The technical field of the present invention is directed to cellular systems or wireless data systems, in which a base station (BS=base station) serves a number of mobile stations (MS=mobile station) on the same time/frequency resources by means of a MU-MIMO system (MU=multiple user, MIMO=multiple input multiple output). The MU-MIMO system is a system wherein a base station comprises $N \geq 2$ transmit antennas and serves a number of mobile stations on the same time/frequency resources. In order to allow each mobile station to receive only data streams intended for the mobile station, the base station has to apply certain antenna weights, also called precoding vectors, to the data streams that the base station transmits to the mobile stations.

In order to select the precoding vectors properly, the base station needs to have some channel state information. In TDD systems (TDD=time-division duplex), this channel state information can be obtained by uplink channel sounding because of the reciprocity of the uplink and downlink channels. In FDD systems (FDD=frequency-division duplex), however, this reciprocity is not available and can thus not be used. There is a need to define a fixed or preset set of precoding vectors. The set of precoding vectors is called code book. The code book is known to both the base station and mobile station. The mobile station selects a precoding vector that maximizes or minimizes some metric defining a signal quality parameter in order to improve its received signal quality. However, it is possible that a high intra-cell spatial interference still exists.

SUMMARY OF THE INVENTION

It is the object of the present invention to provide an improved assignment of precoding vectors in a mobile cellular network.

The object of the present invention is achieved by a method of assigning precoding vectors in a mobile cellular network, wherein a base station provides a code book comprising indexed precoding vectors to one or more mobile stations associated with the base station via a downlink channel, a mobile station associated with the base station selects from the code book one or more indices of preferred precoding vectors and reports the indices of the one or more preferred precoding vectors to the base station via an uplink channel, the mobile station selects from the code book one or more indices of preferred companion precoding vectors which are precoding vectors that shalt preferably be used by the base station for other mobile stations served by the base station on the same time/frequency resource and reports the one or more indices associated with the preferred companion precoding vectors to the base station via the uplink channel, and the base station determines for each mobile station associated with the base station a precoding vector based on the reported one or more indices of the preferred precoding vectors and based on the reported one or more indices of the preferred companion precoding vectors. The object of the present invention is also achieved by a base station in a mobile cellular network, wherein the base station comprises a control unit for assigning precoding vectors, whereby the control unit provides a code book comprising indexed precoding vectors to one or more mobile stations associated with the base station via a downlink channel, the control unit receives one or more indices of preferred precoding vectors selected from the code book from each of the one or more mobile station associated with the base station via an uplink channel, the control unit receives one or more indices of preferred companion precoding vectors selected from the code book from each of the one or more mobile units via the uplink channel, the preferred companion preceding vectors are precoding vectors that shall preferably be used by the base station for other mobile stations served by the base station on the same time/frequency resource and the control unit determines for each mobile station associated with the base station a precoding vector based on the reported one or more indices of the preferred precoding vectors and based on the reported one or more indices of the preferred companion precoding vectors.

The present invention provides an effective method for reducing intra-cell spatial interference. In practice, only the mobile station has complete channel information. Therefore, the base station can only estimate signal quality parameters, such as the signal-to-noise-and-interference-ratio. However, the mobile station is able to measure or calculate a suitable signal quality parameter. The conventional selection of precoding vectors for and assignment to mobile stations by the base station is based on preferred precoding vectors of the mobile stations only and it is not taken into account that the transmission to one mobile station with its preferred precoding vector also creates interference for all other mobile stations served on the same time/frequency resources. The present invention removes this disadvantage, since the mobile station provides information of other mobile stations to the base station by means of the preferred companion precoding vectors. The base station of the present invention is able to assign precoding vectors to its associated mobile stations which are mutually exclusive. Mutually exclusive preferably means that a precoding vector assigned to a first mobile station is a preferred companion precoding vector of another mobile station served by the same base station and vice versa. Therefore, not only the signal quality at the mobile station is improved, but also the communication bandwidth provided by the base station to each of its associated mobile stations. Consequently, transmission errors between the base station and the mobile station are reduced and the data throughput is increased. Moreover, by means of exchanging precoding vector indices between the base station and the mobile station only, the amount of signaling overhead is reduced. A reduced amount of signaling traffic between the base station and the mobile station reduces further intra-cell spatial interference.

Further advantages are achieved by embodiments of the present invention indicated by the dependent claims.

According to a preferred embodiment of the present invention, the mobile station calculates a signal quality parameter for each precoding vector of the code book or a subset of the precoding vectors of the code book. In particular, the signal quality parameter is a real scalar inter-cell interference indicator indicating a inter-cell spatial interference, a intra-cell spatial interference, a received signal strength, a signal-to-noise-ratio, and/or a signal-to-interference-and-noise-ratio. A real scalar inter-cell interference indicator is a real number which can be easily compared with other real numbers of the same type by means of relations, in particular "less than", "greater than", and/or "equal to". Therefore, an evaluation criterion for the preceding vectors exists, which can be used during the selection process of preferred precoding vectors and preferred companion precoding vectors. The mobile station selects the indices of the preferred precoding vectors and preferred companion preceding vectors based on the calculated signal quality parameters.

According to a preferred embodiment of the present invention, the base station applies to the antennas of the base station a sequence of reference signals. Each mobile station of the one or more mobile stations associated with the base station measures the reference signals of said sequence of reference signals and calculates the signal quality parameters based on said measurement.

It is possible, that the reference signals are dedicated pilot signals, i.e. the reference signals are associated with precoding vectors contained in the code book.

Preferably, the base station informs one or more mobile stations associated with the base station about the sequence of dedicated reference signals associated with precoding vectors contained in the code book to be applied to an antenna of the base station. This information can be signaled, preferably by means of specific signaling messages, from the base station to the mobile stations via the downlink channel.

It is also possible, that the reference signals are common reference signals, i.e. reference signals which are not associated with precoding vectors.

The calculation of the signal quality parameters is performed under the assumption that the base station uses the precoding vectors from the known code book for the data transmission. Preferably, based on said measurement, the mobile station calculates a received signal strength, a signal-to-noise-ratio, a signal-to-interference-and-noise-ratio, and/or intra-cell spatial interference indicator. In case, that the reference signals are common pilot signals, each mobile station of the one or more mobile stations calculates the signal quality parameters based on said measurement and the precoding vectors, wherein preferably one or more reference signals of the sequence of reference signals are multiplied by the respective precoding vector.

Furthermore, it is possible to represent said calculated signal quality parameters based on said measurement as a function of the precoding vector index. The extrema of said function are related to preferred precoding vector indices and preferred companion precoding vector indices. For instance, in case the calculated signal quality parameter is a received signal strength, a signal-to-noise-ratio or a signal-to-interference-and-noise-ratio, then indices close to the regions of the minima of said function are designated as preferred companion precoding vector indices and indices close to the regions of the maxima of said function are designated as preferred precoding vector indices.

According to a preferred embodiment of the present invention, the mobile station selects the one or more indices of preferred precoding vectors and the one or more indices of preferred companion precoding vectors based on the calculated signal quality parameters. Preferably, the selection process is performed as above described by means of a respective function indicating a signal quality parameter depending on the precoding vector index. The one or more preferred preceding vectors show a high or a maximum received signal strength, signal-to-noise-ratio and/or signal-to-interference-and-noise-ratio. In contrast to that, the one or more preferred companion precoding vectors show a low or a minimum received signal strength, signal-to-noise-ratio and/or signal-to-interference-and-noise-ratio.

According to a preferred embodiment of the present invention, the mobile station selects an index of one preferred precoding vector and one or more indices of auxiliary preferred precoding vectors which are reported to the base station via an uplink channel. The auxiliary precoding vector is an alternative to the preferred precoding vector if the preferred precoding vector cannot be assigned as determined precoding vector to the respective mobile station. By means of introducing auxiliary precoding vectors it is possible to assign different preceding vectors to two different mobile stations, even if these two mobile stations have reported the same preferred precoding vector index to the base station.

According to a preferred embodiment of the present invention, the mobile station reports the calculated signal quality parameters assigned to the one or more preferred companion precoding vectors to the base station. Then, the base station determines the precoding vectors for the mobile stations based on said signal quality parameters assigned to the one or more preferred companion precoding vectors. The base station can optimize across its associated mobile stations the overall signal quality based on the additional information of signal quality parameters assigned to the one or more preferred companion precoding vectors provided by the mobile station.

According to a preferred embodiment of the present invention, the base station informs one or more mobile stations associated with the base station about a respective threshold of a signal quality parameter which is acceptable for a preceding vector to be selected as preferred companion precoding vectors at the respective mobile station. A respective mobile station calculates the signal quality parameters for two or more, preferably all, precoding vectors of the code book. The respective mobile station compares the calculated signal quality parameters with the threshold. The respective mobile station selects the index or indices of that precoding vectors as preferred companion precoding vectors which comply with the threshold. A threshold value provides a level of minimum acceptance of a preferred companion preceding vector. A preferred companion precoding vector not satisfying said threshold and used as preferred companion preceding vector, i.e. as precoding vector of another mobile station, will significantly degrade the signal quality at the mobile station.

According to a preferred embodiment of the present invention, the mobile station selects only those preceding vectors as preferred companion precoding vectors which produce in combination with a preferred precoding vector an intra-cell spatial interference remaining below a predefined threshold. Instead of the intra-cell spatial interference, it is also possible to use a received signal strength, a signal-to-noise-ratio or a signal-to-interference-and-noise-ratio which will be enhanced.

According to a preferred embodiment of the present invention, the base station informs a mobile station of the one or more mobile stations associated with the base station about a preset number of indices of preferred companion precoding vectors. The mobile station selects the preset number of indices of preferred companion precoding vectors. In cases in which a preset number of indices of preferred companion is used, the number of indices of preferred companion precoding vectors is not required in the uplink feedback and therefore reduces the administrative signaling between the mobile station and the base station. Furthermore, a preset number of indices of preferred companion precoding vectors simplifies the administration of preferred companion preceding vector indices associated with their respective mobile station at the base station.

According to a preferred embodiment of the present invention, the base station determines the precoding vectors for the mobile stations so that a precoding vector index of the mobile station is a preferred companion precoding vector index of another mobile station for a maximum number of the mobile stations. For example, the base station uses the received indices as input parameter of an optimization algorithm, e.g. an exhaustive search algorithm, which finds out an assignment of preceding vectors to mobile stations that fulfills the aforementioned condition.

Preferably, in order to provide intra-cell spatial interference reduction to a maximum number of mobile stations associated with the base station, the base station pairs or combines each index of the reported one or more indices of the preferred preceding vectors with one index of the reported one or more indices of the preferred companion precoding vectors. Each index of the reported one or more indices of the preferred precoding vectors associated with one of the mobile stations of said maximum number of mobile stations is paired with one index of the reported one or more indices of the preferred companion precoding vectors associated with another mobile station of said maximum number of mobile stations.

It is possible that each mobile station associated with the base station chooses only one or more indices of the one or more indices of the preferred companion precoding vectors if the chosen one or more preferred companion precoding vectors associated with the selected one or more indices have a signal quality parameter below a threshold and each mobile station reports the chosen one or more indices as the selected one or more indices associated with the preferred companion precoding vectors to the base station via the uplink channel.

BRIEF DESCRIPTION OF THE DRAWINGS

These, as well as further features and advantages of the invention will be better appreciated by reading the following detailed description of presently preferred embodiments taken with the accompanying drawing of:

FIG. 1 shows a base station 21 and three mobile stations 41, 42, 43 in a cell of a mobile cellular network. The base station 21 comprises an antenna. The antenna comprises three antenna units 212, wherein each antenna unit 212 is assigned to a different sector of the cell. Each antenna unit 212 is formed of a linear antenna array with four equal linear antenna elements 213 arranged in parallel. It is also possible, that the antenna unit 212 of the base station 21 has any other antenna configuration, e.g. horizontally or vertically polarized antenna elements 213 or cross-polarized antenna elements, whereby preferably two antenna elements arranged at +45° and two antenna elements arranged at −45°. A control unit of the base station 21 can apply different preceding vectors to each antenna array of the base station 21 separately, in order to control beam forming. A beam is defined by its associated precoding vector. However, beam forming is a special case of linear precoding. In particular, for correlated antenna arrays, e.g. lambda/2 spaced linear arrays, precoding results in beam forming; for uncorrelated antennas, e.g. 10 lambda spaced antenna arrays, no distinct beams are formed. The invented solution works with both correlated and uncorrelated antenna arrays. A preceding vector is a complex vector defining a complex antenna weight for each linear antenna element 213. Preferably, the absolute value of the antenna weight equals 1 and thereby only defines a phase factor. It is also possible to define the amplitude when the absolute value of the antenna weight does not equal 1. Furthermore, the control unit of the base station 21 is composed of software and hardware means, i.e. one or more data processing units, a software platform and one or more application programs running on that system platform, adapted to execute the assignment of precoding vectors in a mobile cellular network.

Figure 1:
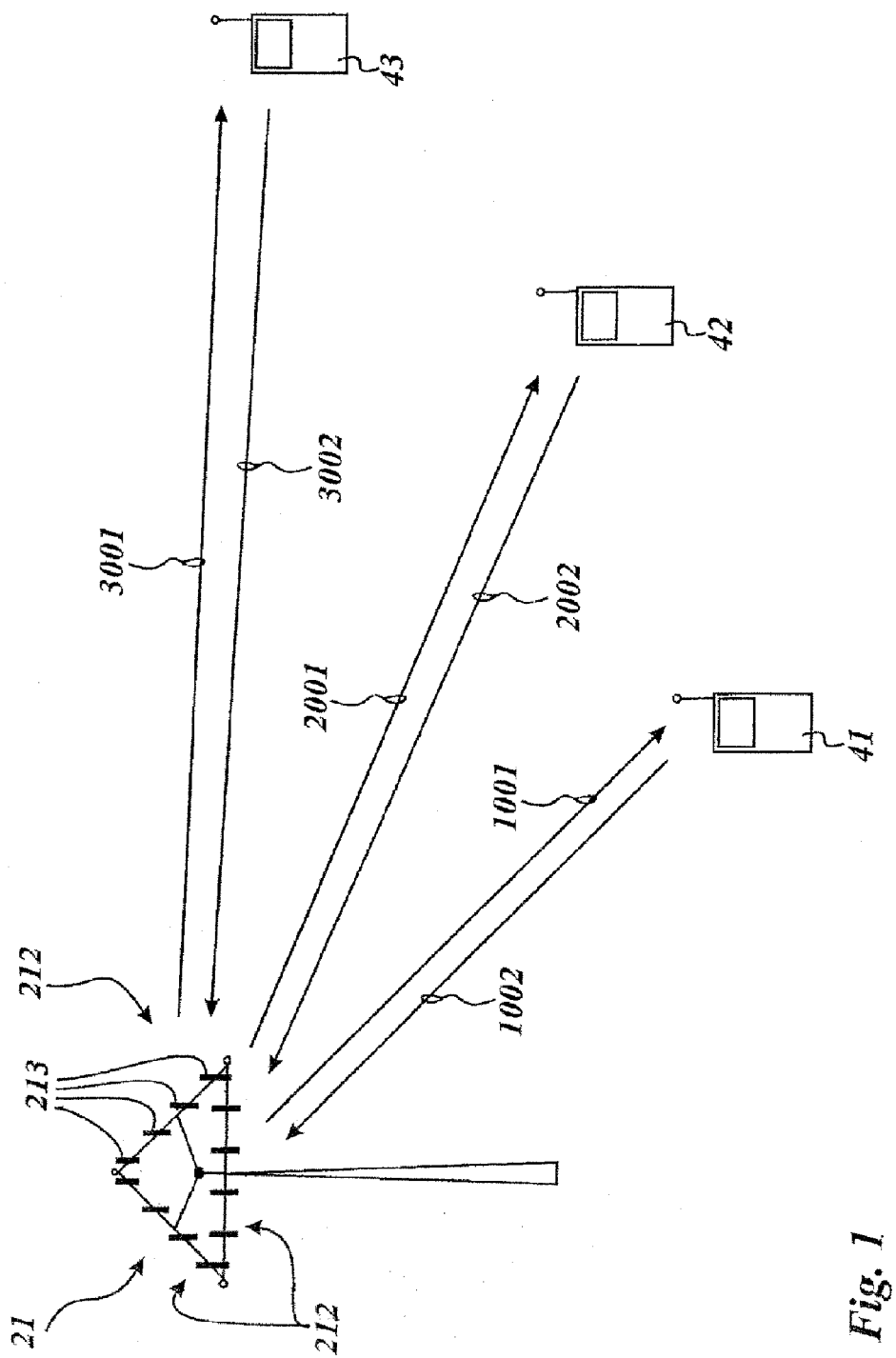
FIG. 1 shows view of a base station with an antenna providing communication to three mobile stations.

The control unit of the base station 21 is adapted to control the beam forming of the antenna unit 212 and to provide communication functionality for the base station 21 with other base stations of the cellular mobile network and/or the mobile stations 41, 42, 43. Base stations of the cellular mobile network communicate with other base stations via fixed communication lines of a core network. The base station 21 of the cellular mobile network provides wireless access to the mobile stations 41, 42, 43 located in the cellular mobile network. In order to access the base station 21 wirelessly, each mobile station 41, 42, 43 comprises a control unit, an antenna, and a RF (RF radio frequency) communication unit feeding the antenna. It is possible, that the antenna of each mobile station 41, 42, 43 comprises one or more antenna units. The control unit of each mobile station 41, 42, 43 controls the antenna of each mobile station 41, 42, 43 and provides wireless communication functionality for the mobile station 41, 42, 43. Furthermore, the control unit of each mobile station 41, 42, 43 provides functionality for calculating and/or measuring signal quality parameters, such as SIR (SIR=signal-to-interference-ratio), SNR (SNR=signal-to-noise-ratio), SINR (SINR=signal-to-interference- and noise-ratio), and/or received signal strength. The control unit of each mobile station 41, 42, 43 also provides functionality for sending, receiving and/or transmitting signals providing wireless communication between the mobile stations 41, 42, 43. Furthermore, the control unit of each mobile station 41, 42, 43 provides functionality for sending, receiving and/or transmitting signals of the calculated and/or measured signal quality parameters.

In a preferred embodiment of the invention, the base station 21 transmits information to its associated mobile stations 41, 42, and 43 via downlink channels 1001, 2001, and 3001, respectively. The mobile stations 41, 42, and 43, which are associated with the base station 21, transmit information to their base station 21 via uplink channels 1002, 2002, and 3002, respectively. The downlink channels 1001, 2001, 3001 are frequency-separated from the uplink channels 1002, 2002, 3002.

Preferably, the base station 21 and the mobile stations 41, 42 and 43 are components of a MU-MIMO system.

For instance, the base station 21 has $N \geq 2$ transmit antenna units, which serves a number of K mobile stations 41, 42, 43. Each mobile station 41, 42, 43 $i$, $i=1, \ldots, K$ comprises $M_i \geq 1$ receive antenna units, also called antenna units. For transmitting data on a certain time/frequency resource, the base station 21 selects a group of mobile stations 41, 42, 43 from alt K available mobile stations. Without loss of generality, it is assumed that the mobile stations 41, 42, 43 $j$, $j=1, \ldots, L$, $L \leq N$ are selected. It is further assumed, that, in the present case, each mobile station 41, 42, 43 comprises only one antenna unit as receive antenna, i.e., $M_i = M = 1$. The base station 21 transmits one data stream $s_j$ to each mobile station 41, 42, 43. In order to allow each mobile station 41, 42, 43 $j$ to receive only the data stream $s_j$ intended for it, the base station 21 applies certain antenna weights, defined by the precoding vectors, to the data streams the base station 21 sends out. The vector t of the transmitted signals from the N base station antenna units can be written in matrix notation as $$t = \begin{pmatrix} t_1 \\ t_2 \\ \vdots \\ t_N \end{pmatrix} = \underbrace{\begin{pmatrix} p_{11} & p_{12} & \cdots & p_{1L} \\ p_{21} & p_{22} & \cdots & p_{2L} \\ \vdots & \vdots & \ddots & \vdots \\ p_{N1} & p_{N2} & \cdots & p_{NL} \end{pmatrix}}_{P} \cdot \underbrace{\begin{pmatrix} s_1 \\ s_2 \\ \vdots \\ s_L \end{pmatrix}}_{s},$$

$$\underbrace{(p_1 \quad p_2 \quad \cdots \quad p_L)}$$

with the vector of data streams s, the antenna weights, i.e. the precoding column vectors, $p_j$, $j=1, \ldots, L$ which define a precoding matrix P. The received signal at the mobile station 41, 42, 43 $j$ is $$r_1^{(j)} = h_1^{(j)} t + n_1^{(j)} = (h_{11}^{(j)} h_{12}^{(j)} \ldots h_{1N}^{(j)}) \cdot t + n_1^{(j)},$$

with the channel vector $h_1^{(j)}$ describing the channels between the N antenna units of the base station 21 and the mobile station's receive antenna unit. $n_1^{(j)}$ is an additive noise and inter-cell interference term. The received signal at the mobile station 41, 42, 43 $j$ can be rewritten as $$r_1^{(j)} = h_1^{(j)} \cdot t + n_1^{(j)} = h_1^{(j)} \cdot (p_1 p_2 \ldots p_L) \cdot s + n_1^{(j)}$$

$$r_1^{(j)} = (h_1^{(j)} \cdot p_1 \, h_1^{(j)} \cdot p_2 \ldots h_1^{(j)} \cdot p_L) \cdot s + n_1^{(j)}.$$

The term $h_1^{(j)} \cdot p_j \cdot s_j$ describes the signal for the mobile station 41, 42, 43 $j$, and the term $$\sum_{n=1, n \neq j}^{L} h_1^{(j)} \cdot p_n \cdot s_n$$

describes the spatial intra-cell (multi-user) interference observed by the mobile station 41, 42, 43 $j$.

In order to allow the mobile station 41, 42, 43 $j$ to properly receive its data stream $s_j$, the base station 21 selects the precoding vectors in such a way that the spatial interference is kept at an acceptable level with respect to the desired signal. Examples are:

$$h_1^{(j)} \cdot p_j \cdot s_j \gg \sum_{n=1, n \neq j}^{L} h_1^{(j)} \cdot p_n \cdot s_n,$$

or, more stringent, $$\begin{cases} h_1^{(j)} \cdot p_j \neq 0 \\ \sum_{n=1, n \neq j}^{L} h_1^{(j)} \cdot p_n \cdot s_n = 0^* \end{cases}$$

This selection at the base station 21 is performed in such a way that the above conditions are fulfilled for all L selected mobile stations. It is possible to include the two given criteria and in particular the actual data streams $s_j$, $j=1, \ldots, L$ into the selection process. It is also possible to include some function of the terms $h_1^{(j)} \cdot p_n$, $n=1, \ldots, L$, $n \neq j$ into the selection process, which can be used as a measure for the spatial interference, preferably with the mean power of $s_j$ as a parameter.

In practice, the base station 21 requires channel state information in order to select the precoding vectors property. In a time-division duplex (TDD) systems, this channel state information can be obtained by uplink channel sounding because of the reciprocity of the uplink channels and downlink channels. In frequency-division duplex (FDD) systems, however, this reciprocity is not available and can thus not be used. It is therefore common to define a fixed or a preset set of precoding vectors, i.e. the code book, known to both the base station 21 and mobile station 41, 42, 43, from which the mobile station 41, 42, 43 selects the vector that maximizes or minimizes some metric, e.g. the received signal power or the signal-to-noise-and-interference-ratio. Then, only the preferred preceding vector index (PVI=precoding vector index) needs to be signaled back to the base station 21.

The following can be done in order to improve the selection process and the assignment of preceding vectors of the base station 21 to its associate mobile station 41, 42, 43 for transmitting on the same time/frequency resources without knowledge of the full channel vector/matrix for each mobile station 41, 42, 43:

The mobile stations 41, 42, 43 do not only report their preferred PVIs (PVI=precoding vector index) via the uplink feedback, but also reports the indices of preferred CPVI (CPVI=companion precoding vector index), i.e. preceding vectors that produce a very low or at least an acceptable spatial interference at the mobile station 41, 42, 43. The base station 21 selects the mobile stations 41, 42, 43, i.e. its associated preferred PVIs, in such a way that the preferred PVIs are mutually exclusive. At the same time, the preferred PVIs of each mobile station are within the set of preferred CPVI of all other selected mobile stations or at least the preferred PVIs of each mobile station are within the set of preferred CPVI of a large number of other selected mobile stations.

For reporting of the preferred CPVIs, each mobile station 41, 42, 43 reports to the base station 21 at least one preferred CPVI or a preset or a fixed number of preferred CPVIs. The preferred CPVI corresponds to the preceding vector, which minimizes the intra-cell spatial interference.

In case the spatial interference remains below some threshold, e.g. a threshold value of the SINR at the mobile station, for each additional corresponding precoding vector, a mobile station 41, 42, 43 can report more than one preferred CPVI. However, a threshold value is not applicable if a fixed and/or preset number of preferred CPVIs is reported to the base station 21. The threshold value can either be the same value as the value of the first preferred CPVI, or it is a higher value than the value of the first preferred CPVI.

It is obvious that the meaning of the relation "larger", "above" etc. is depending on the type of metric and has to be exchanged with "small", "below" etc. depending on the metric. For instance, if the metric is related directly to interference, at the mobile station 41, 42, 43, acceptable CPVIs provide interference, which is lower than a threshold value indicating an acceptable level of interference. However, the opposite is the case when the metric is related indirectly to the interference, i.e. then, acceptable CPVIs provide a respective value exceeding the threshold value.

Preferably, in case more than one preferred CPVI is reported, the preferred CPVIs are reported in ascending order, i.e. first the preferred CPVI for which the corresponding preceding vector results in the lowest spatial interference and last the preferred CPVI for which the corresponding precoding vector results in the highest spatial interference. In addition to the preferred CPVIs, the mobile station 41, 42, 43 can also report the corresponding amount of spatial interference by e.g. some scalar spatial interference indicator value or any other suitable scalar real value based on a metric indicating a signal quality.

Preferably, the maximum number of reported preferred CPVIs can be configured by the base station 21 in a dynamic, semi-static, or static way by means of signaling the maximum number of reported preferred CPVIs via the downlink channel 1001, 2001, 3001 to the mobile station 41, 42, 43. Said maximum number of reported preferred CPVIs can be individually specified for each mobile station 41, 42, 43.

Preferably, a threshold for additional preferred CPVIs with respect to the threshold value for the first preferred CPVI is configured by the base station 21 in a dynamic, semi-static, or static way and signaled to the mobile stations 41, 42, 43 via the downlink channel 1001, 2001, 3001. Said threshold for additional preferred CPVIs with respect to the value for the first preferred CPVI can be individually specified for each mobile station 41, 42, 43.

Furthermore, it is possible that the base station 21 orders the indices of the precoding vectors in such a way that similar precoding vectors are indexed with a similar index, wherein the index is preferably a number. For instance, the code book comprises six precoding vectors $p_i$ with index i=1, 2, 3, 4, 5 or 6. The respective precoding vectors may define beam forms which can be generated by the antennas of the base station 21. These six precoding vectors are ordered such that the absolute difference of two of the indices i=1, 2, 3, 4, 5 or 6 is indirectly related to an amount of intra-cell spatial interference. For example, the mobile station 41 reports the precoding vector $p_1$ as preferred precoding vector, and the precoding vectors $p_4$ and $p_6$ as preferred companion precoding vectors; the mobile station 42 reports the precoding vector $p_4$ as preferred precoding vector, and the precoding vectors $p_1$ and $p_6$ as preferred companion precoding vectors; and the mobile station 43 reports the precoding vector $p_6$ as preferred precoding vector, and the precoding vectors $p_1$ and $p_4$ as preferred companion precoding vectors. In such a case, the base station 21 will assign the precoding vector $p_1$ to the mobile station 41, the precoding vector $p_4$ to the mobile station 42, and the precoding vector $p_6$ to the mobile station 41. In this case, it is possible to define a threshold value for companion precoding vectors with a minimum absolute difference of indices |i−j|, e.g. |i−j| equals 2.

Figure 2:
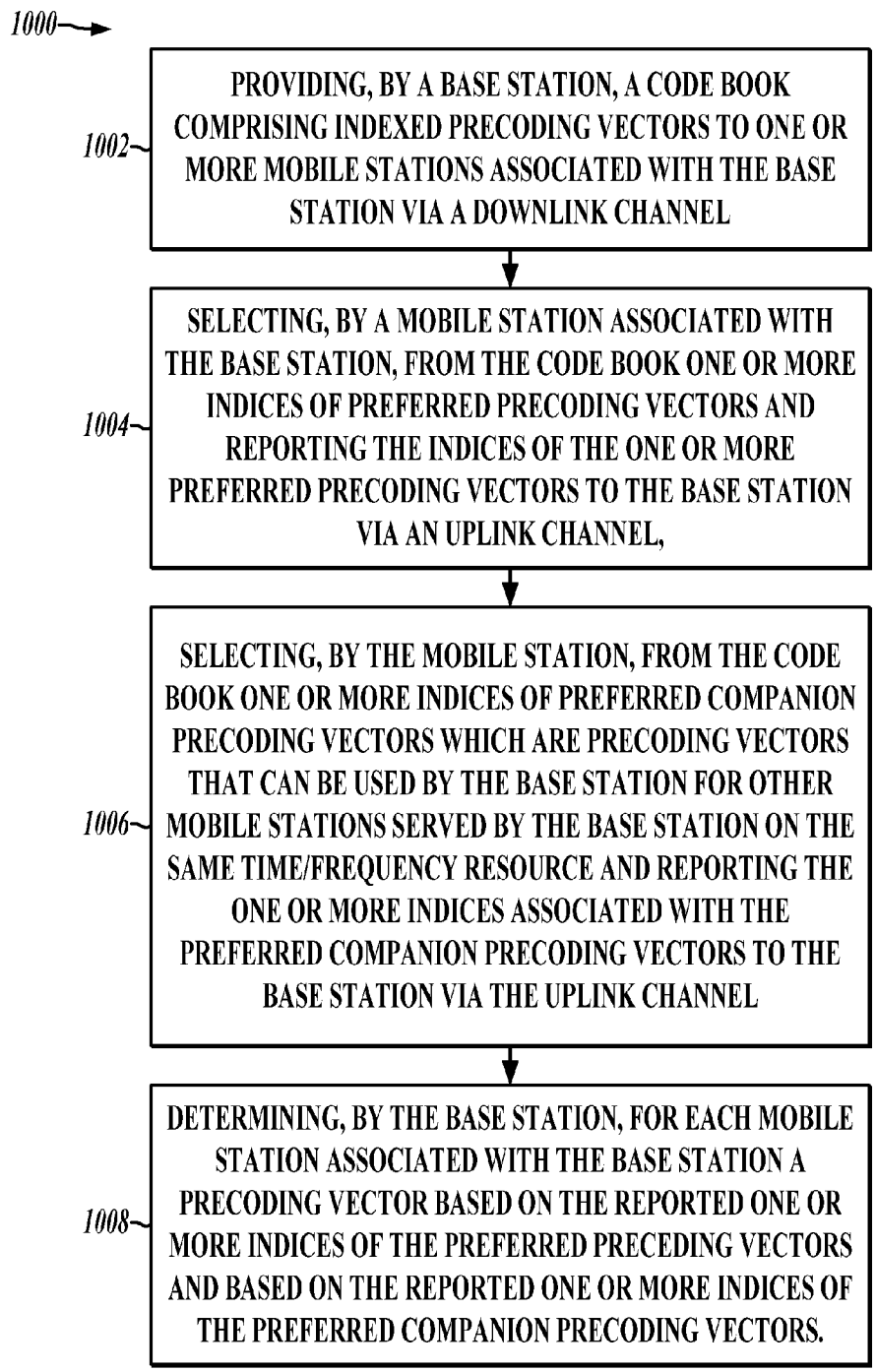
FIG. 2 shows a flow diagram illustrating an exemplary method of assigning precoding vectors in a mobile cellular network.

Referring also to FIG. 2, a flow diagram illustrates an exemplary method 1000 of assigning precoding vectors in a mobile cellular network. A base station provides a code book at 1002 comprising indexed precoding vectors to one or more mobile stations associated with the base station via a downlink channel. At 1004, a mobile station associated with the base station selects from the code book one or more indices of preferred precoding vectors and reports the indices of the one or more preferred precoding vectors to the base station via an uplink channel. At 1006, the mobile station selects one or more indices of preferred companion precoding vectors from the code book which are precoding vectors that can be used by the base station for other mobile stations served by the base station on the same time/frequency resource. At 1006, the mobile station also reports the one or more indices associated with the preferred companion precoding vectors to the base station via the uplink channel. At 1008, the base station determines for each mobile station associated with the base station a precoding vector based on the reported one or more indices of the preferred precoding vectors and based on the reported one or more indices of the preferred companion precoding vectors.

The invention claimed is:

1. A method of assigning precoding vectors in a mobile cellular network, wherein the method comprises the steps of:
   selecting, by a mobile station associated with the base station, from a code book comprising indexed precoding vectors, one or more indices of preferred precoding vectors and reporting the indices of the one or more preferred precoding vectors to the base station via an uplink channel;
   selecting, by the mobile station, from the code book one or more indices of preferred companion precoding vectors which are precoding vectors that can be used by the base station for other mobile stations served by the base station on the same time/frequency resource and reporting the one or more indices associated with the preferred companion precoding vectors to the base station via the uplink channel; and
   assigning, by the base station, for each mobile station associated with the base station a precoding vector based on the reported one or more indices of the preferred precoding vectors and based on the reported one or more indices of the preferred companion precoding vectors.

2. A method of assigning precoding vectors in a mobile cellular network according to claim 1, wherein the method comprises the steps of:
   calculating, by the mobile station, a signal quality parameter for each precoding vector of the code book or a subset of the precoding vectors of the code book, in particular a real scalar inter-cell interference indicator indicating a inter-cell spatial interference, a received signal strength, a signal-to-noise-ratio or a signal-to-interference-and-noise-ratio, and selecting the indices of the preferred precoding vectors and preferred companion precoding vectors based on the calculated signal quality parameters.

3. A method of assigning precoding vectors in a mobile cellular network according to claim 2, wherein the method comprises the further steps of:
   applying, by the base station, to the antennas of the base station a sequence of reference signals;
   measuring, by each mobile station of the one or more mobile stations associated with the base station, the reference signals of said sequence of reference signals and calculating the signal quality parameters based on said measurement.

4. A method of assigning precoding vectors in a mobile cellular network according to claim 2, wherein the method comprises the steps of:
   selecting, by the mobile station, the one or more indices of preferred precoding vectors and the one or more indices of preferred companion precoding vectors based on the calculated signal quality parameters, so that the one or more preferred precoding vectors show a high received signal strength, signal-to-noise-ratio and/or signal-to-interference-and-noise-ratio and the one or more preferred companion precoding vectors show a low received signal strength, signal-to-noise-ratio and/or signal-to-interference-and-noise-ratio.

5. A method of assigning precoding vectors in a mobile cellular network according to claim 2, wherein the method comprises the steps of:
   reporting, by the mobile station, the calculated signal quality parameters assigned to the one or more preferred companion precoding vectors to the base station; and
   determining, by the base station, the precoding vectors for the mobile stations based on said signal quality parameters assigned to the one or more preferred companion precoding vectors.

6. A method of assigning precoding vectors in a mobile cellular network according to claim 1, wherein the method comprises the steps of:
   selecting, by the mobile station, an index of one preferred precoding vector and at least one index of an auxiliary preferred precoding vector which is reported to the base station via an uplink channel, wherein the auxiliary precoding vector is an alternative to the preferred precoding vector if the preferred precoding vector cannot be assigned as determined precoding vector to the respective mobile station.

7. A method of assigning precoding vectors in a mobile cellular network according to claim 1, wherein the method comprises the steps of:
informing, by the base station, one or more mobile stations associated with the base station about a respective threshold of a signal quality parameter which is acceptable for a precoding vector to be selected as preferred companion precoding vector at the respective mobile station, calculating, by a respective mobile station, the signal quality parameters for two or more, preferably all, precoding vectors of the code book;
comparing, by the respective mobile station, the calculated signal quality parameters with the threshold; and
selecting, by the respective mobile station, the index or indices of that precoding vectors as preferred companion precoding vector indices which comply with the threshold.

8. A method of assigning precoding vectors in a mobile cellular network according to claim 1, wherein the method comprises the steps of:
selecting, by the mobile station, only those precoding vectors as preferred companion precoding vectors which produce in combination with a preferred precoding vector an intra-cell spatial interference remaining below a predefined threshold.

9. A method of assigning precoding vectors in a mobile cellular network according to claim 1, wherein the method comprises the steps of:
informing, by the base station, a mobile station of the one or more mobile stations associated with the base station about a preset number of indices of preferred companion precoding vectors; and
selecting, by the mobile station, the preset number of indices of preferred companion precoding vectors.

10. A method of assigning precoding vectors in a mobile cellular network according to claim 1, wherein the method comprises the step of:
determining the precoding vectors for mobile station so that a preferred precoding vector index of a mobile station is a preferred companion precoding vector index of another mobile station for a maximum number of the mobile stations.

11. A base station in a mobile cellular network, wherein the base station comprises a control unit for assigning precoding vectors which is adapted to:
receive one or more indices of preferred precoding vectors selected from a code book comprising indexed precoding vectors from each of the one or more mobile stations via an uplink channel;
receive one or more indices of preferred companion precoding vectors selected from the code book from each of the one or more mobile stations via the uplink channel, wherein the preferred companion precoding vectors are precoding vectors that can be used by the base station for other mobile stations served by the base station on the same time/frequency resource; and
assign for each mobile station associated with the base station a precoding vector based on the reported one or more indices of the preferred precoding vectors and based on the reported one or more indices of the preferred companion precoding vectors.

* * * * *